Feb. 7, 1967 A. EDLER 3,302,669
MOTOR POWERED RADIAL ARM TOOL SUPPORT
Filed June 29, 1964 9 Sheets-Sheet 1

INVENTOR.
Adolph Edler
BY Polachek & Saulsbury
ATTORNEYS.

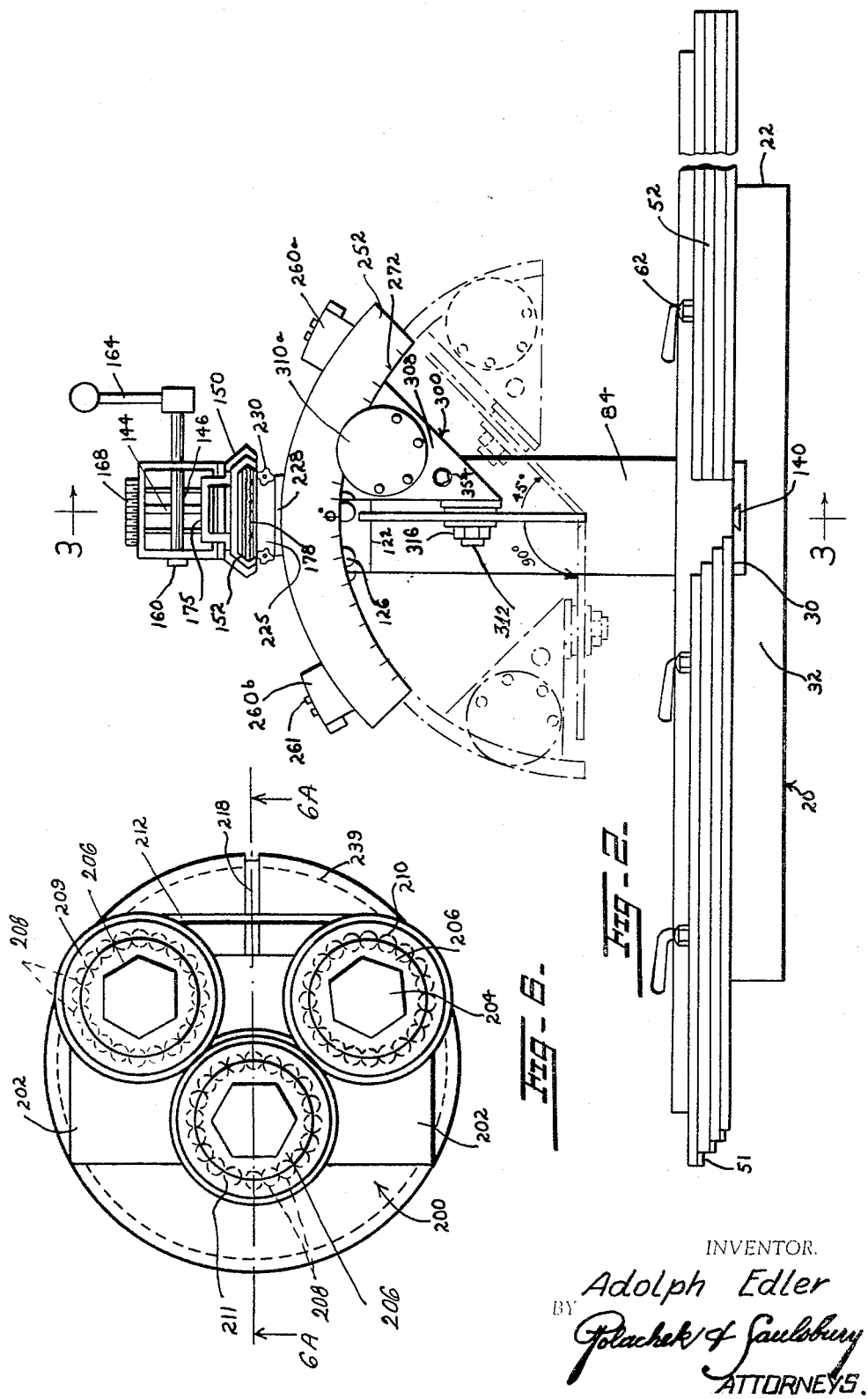

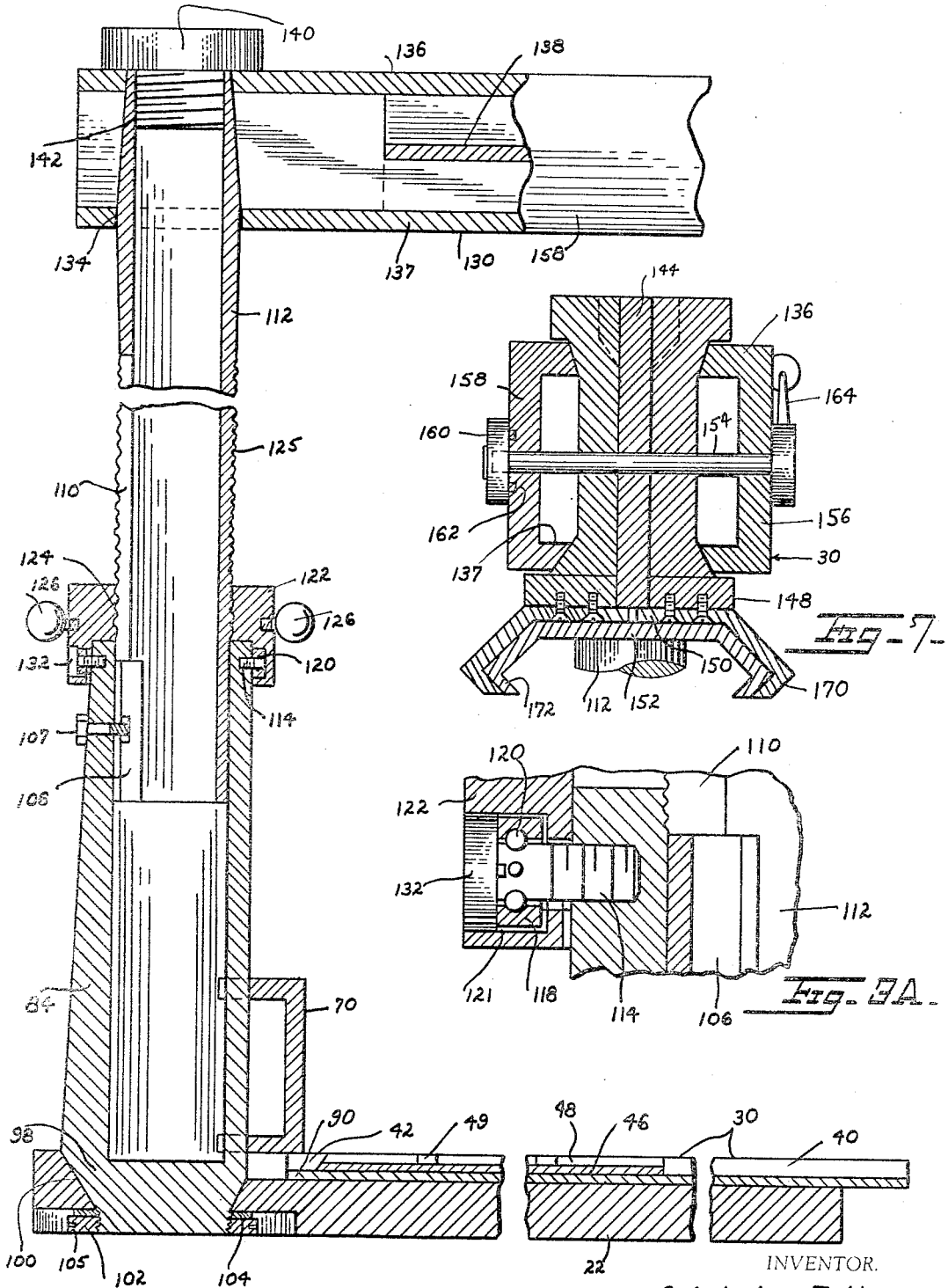

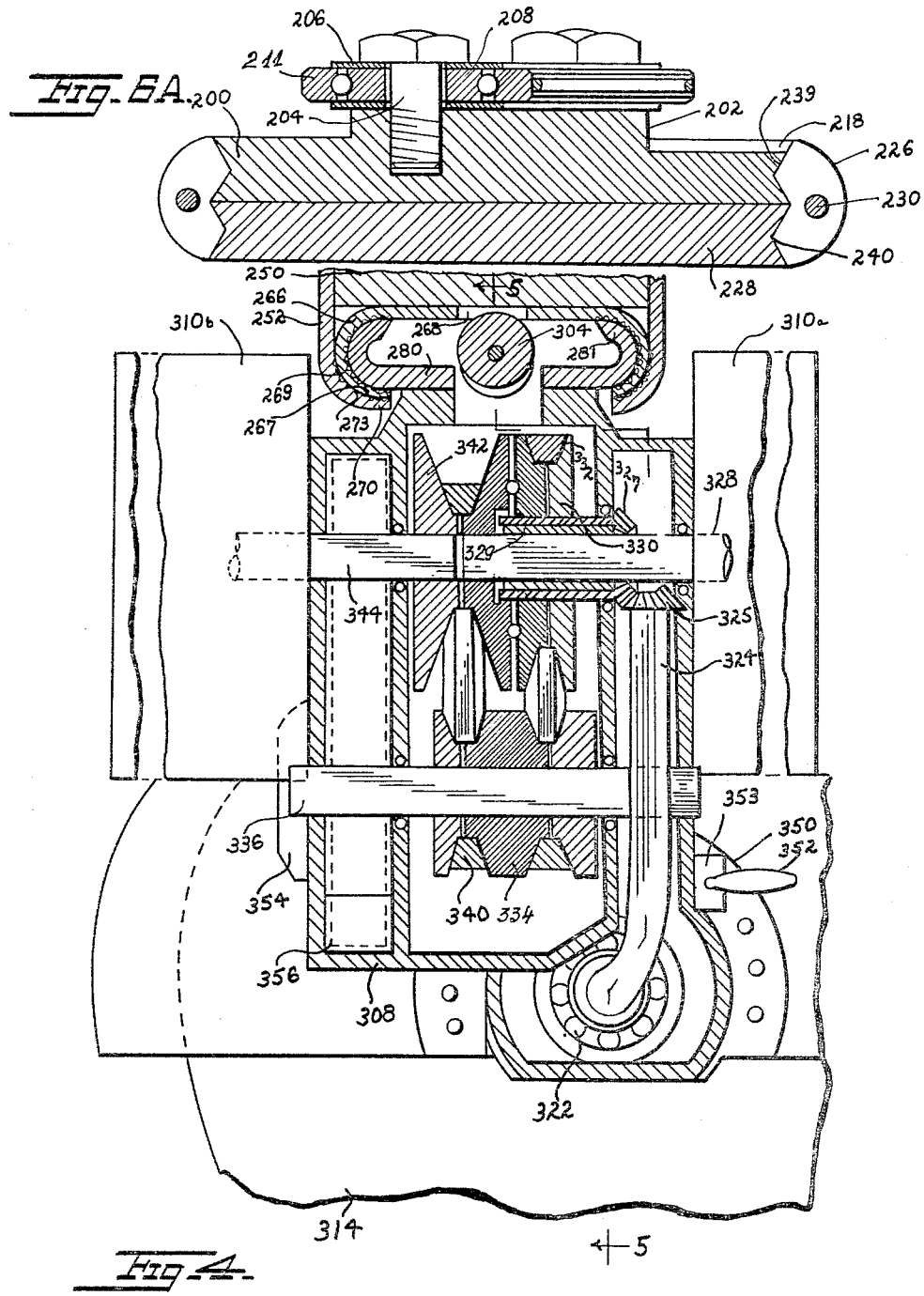

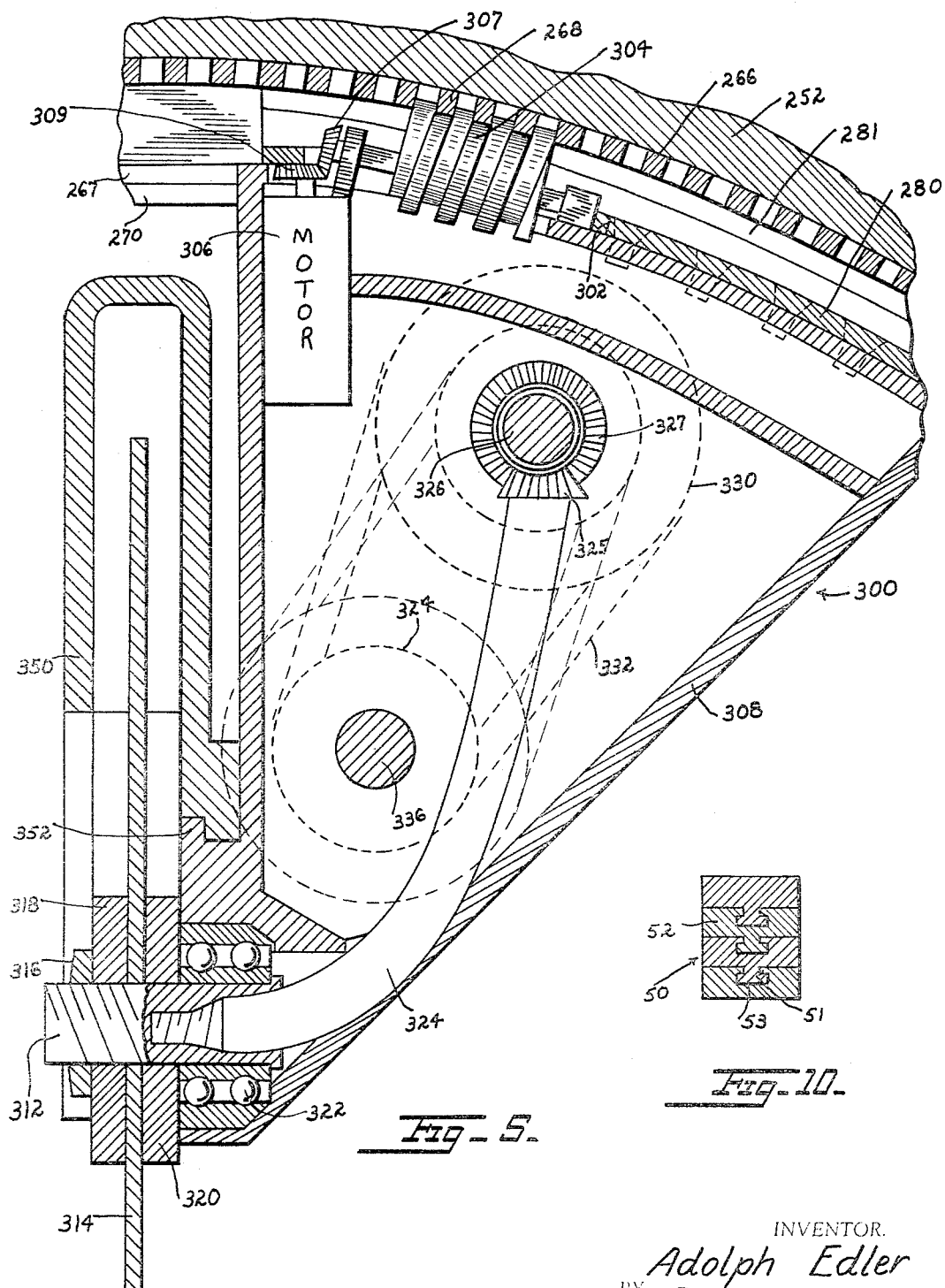

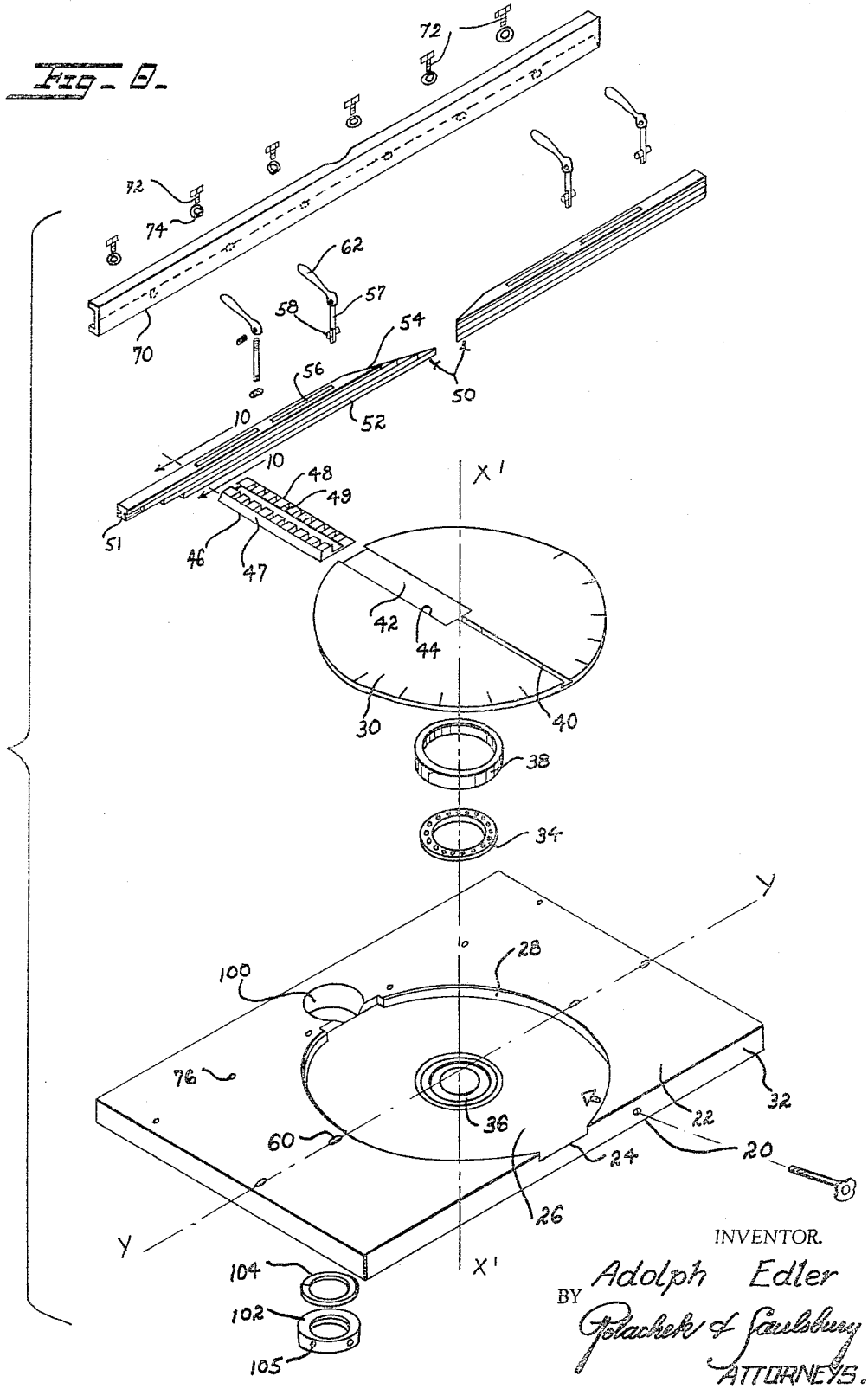

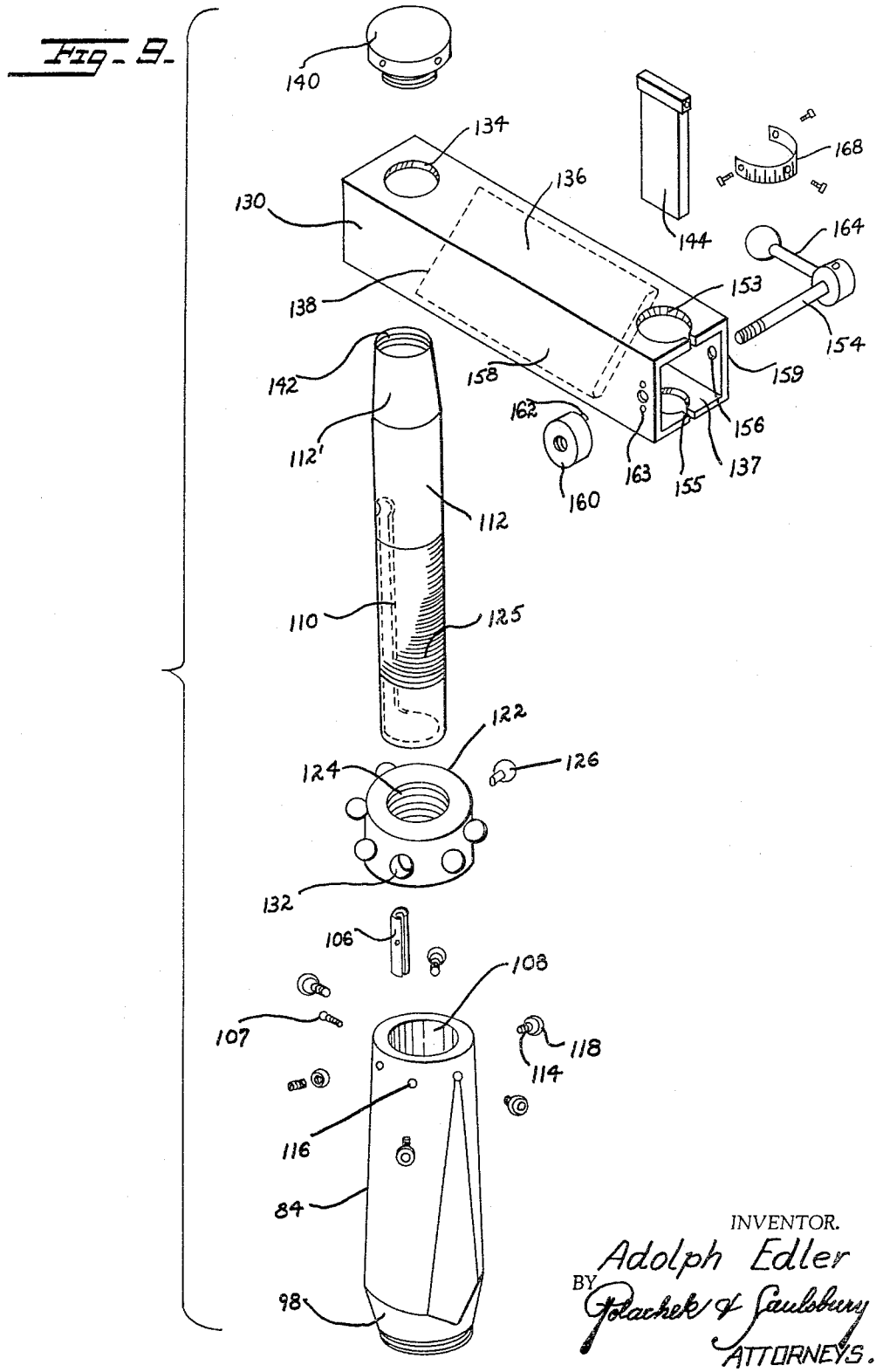

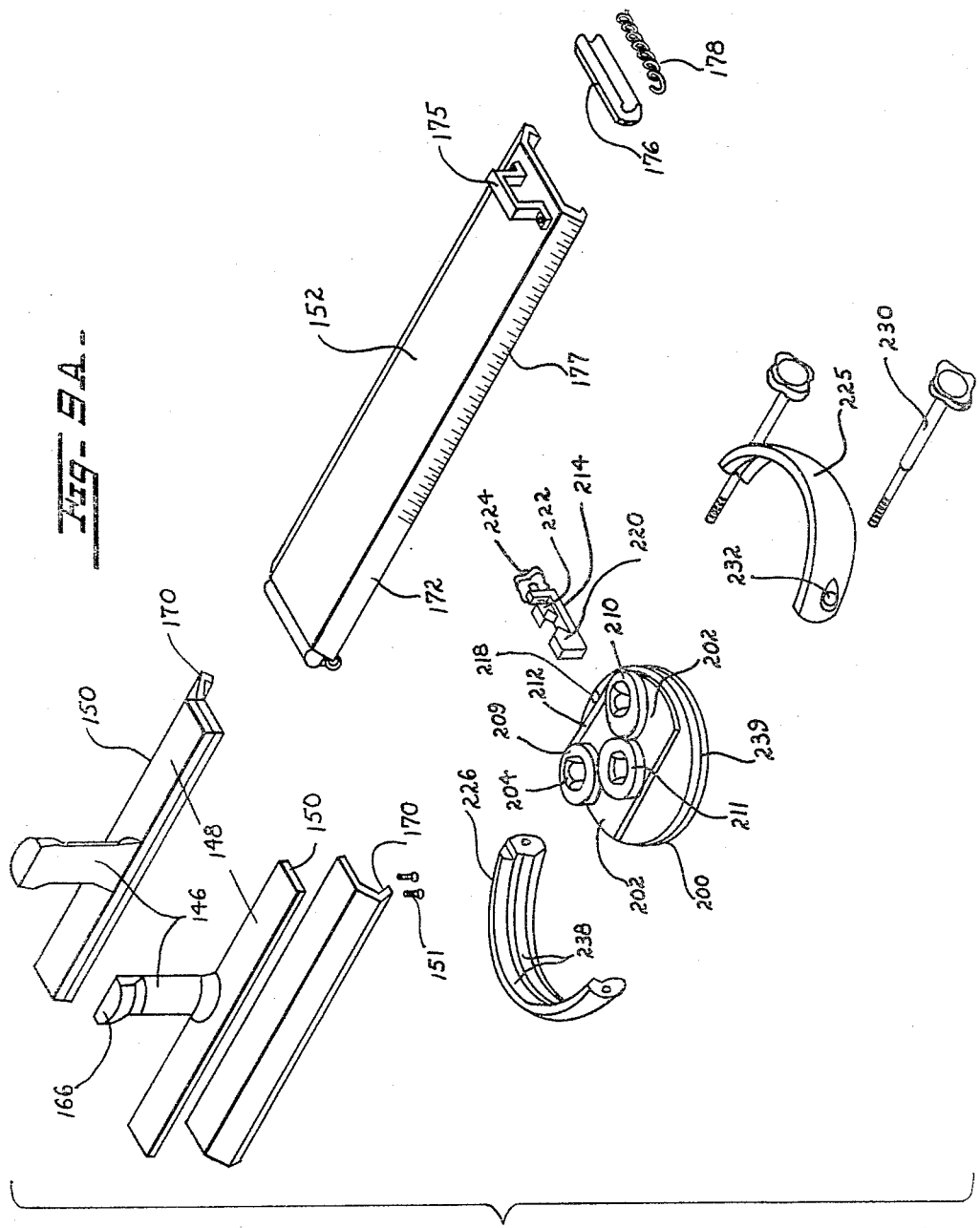

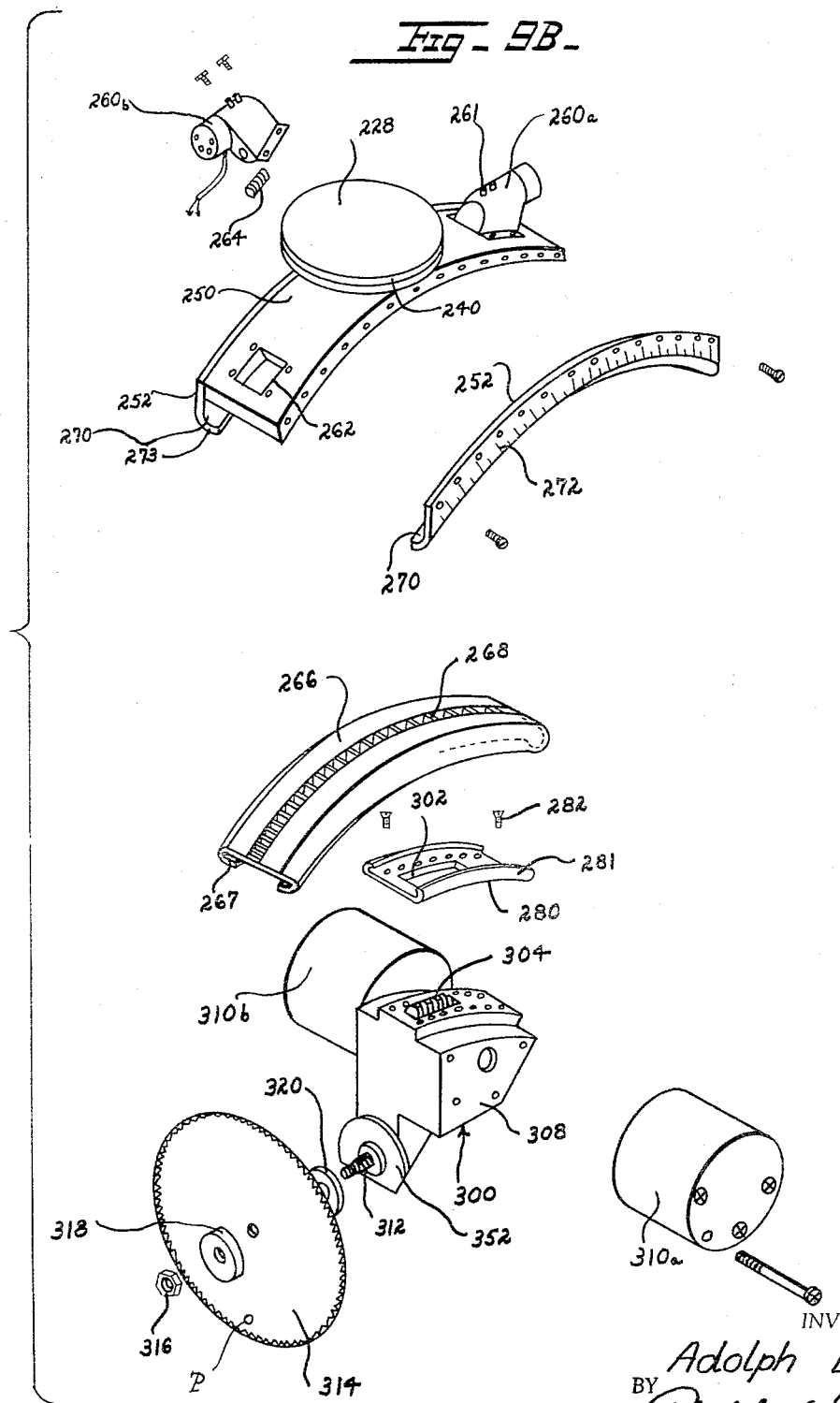

3,302,669
MOTOR POWERED RADIAL ARM TOOL SUPPORT
Adolph Edler, 56 Marvin Drive, King Park,
Long Island, N.Y. 11102
Filed June 29, 1964, Ser. No. 378,550
9 Claims. (Cl. 143—6)

This invention relates to the art of power tools and more particularly concerns an improved motor-powered radial arm tool support for radial saws, drills, reamer and the like.

In conventional radial saws, the rotatable saw blade or other cutting tool mounted in place of the saw blade is offset from the central axis of the yoke, carriage, track arm and column which cooperatively support the blade in different positions for cutting. As a result a number of difficulties and disadvantages are encountered in operating a conventional radial saw.

The present yoke or blade swiveling and tilting mechanism rotates on a vertical axis offset from the plane of the saw blade and tilts on a horizontal axis but which does not lie in the plane of the blade. In other words, this yoke mechanism besides holding the saw blade offset to one side, has two adjustments, one for swiveling the saw blade about the vertical axis and another adjustment for tilting the blade about the horizontal axis. When the yoke is swiveled to position the blade for making rip or novelty cuts, the plane of the saw blade being offset from or outside of the swivel axis of the yoke, swings in a circular path about the swivel axis which also passes through the central axis of the supporting carriage and track mechanism, thereby swiveling the saw blade which places the saw blade at a different spot above the table for each setting.

When the yoke is tilted to position the blade angularly for making bevel cuts, the blade moves in a circular path about the yoke trunnions, since the plane of the blade is offset from the tilting axis. The cutting tip or edge of the blade drops down and away from vertical position for any bevel setting having the same result the bottom tip of the saw blade never occupies the same spot twice for various adjustments. The design of the yokes also limit the performance of bevel cuts to one side of the vertical position of the blade, for to use the other side the blade guard hits the top of the yoke or carriage, or the bottom of the drive motor hits the rip fence. To avoid these complications, the column supporting the carriage and yoke must be raised or lowered for each different angle of bevel cut. This complicates double mitering or compound bevel cutting. The above difficulties are for the most part caused by the conventional arrangement wherein the swivel pivot axis of the yoke is not in line with the vertical plane of the blade and the trunnion pivot axis is not within or more important close to the bottom of the vertical plane of the saw blade.

The horizontal track arm from which the saw carriage is suspended is the arm connected at its center to a fixed overarm or is connected at one end to the vertical column. Thus when the saw blade is turned for mitering, the turret swing pivot axis is not in line with the tracking plane of the blade. The blade tracking pattern occupies two different zones for left-hand and right-hand cuts. In setting up right-hand cuts the saw blade moves forward and away from crosscut while in preparing left-hand cuts, the blade moves back and away to the same side as right-hand cuts. The result is that there is no common point of intersection for three or more cutting strokes made at different angles.

Due to the offset positioning of the blade with respect to yoke and track arm as above described, any parts of the saw assembly which are not precisely square due to wear or improper machining cause inaccuracies in cutting to be magnified by the saw blade. Furthermore, since the controls of the saw assembly are independent and their setting are unrelated, complicated and repeated motions are performed when changing from one setup of the blade to another.

The elevating column for the carriage used in conventional radial saws generally employs internal gearing for raising and lowering the column. If the gearing is driven by a crank at the top of the column, the crank is in an awkward, difficult to reach position. If the elevating crank is located at the front of the saw table or if the gears are located in the base of the saw assembly, the column actuating mechanism is very complicated and requires many expensive parts.

The saw table or working surface in conventional saws has to be soft enough not to dull the blade during cut-off operations, since the cutting edge slightly penetrates the table top. Steel or other materials harder, stronger, and more durable than the blade cannot be used. Since soft material must be used in the saw table, such material is subject to warping, shrinking, twisting, bending, crushing, cutting, and gradual deterioration. As a result, permanent, true alignment of the saw blade with the working surface of the table top is not possible. The work wobbles on the table. The table top becomes grooved, dented, splintered and chipped by the relative shifting of the saw blade and piece being worked upon, during different sawing operations. This constitutes a safety hazard and hinders movement of work pieces when making long cuts in which the wood must be pushed past the blade. The saw table must be replaced from time to time, which is quite expensive. In the meantime, the user encounters gradually deteriorating quality of work being derived from the saw. Furthermore, the saw table becomes unsightly with continued use. Accuracy of work can rarely be obtained.

In some saw tables, the wooden or fiber top is divided into different size pieces or slats to allow for rip or guide fence adjustments. Since the saw blade is offset from its axes of adjustment as above described, it follows a different path across the table for each different cut, and, as the metering angle becomes greater, moves its starting position closer to the table front necessitating the shifting of the guide fence. The slats buckle under pressure from their clamping mechanism to cause additional misalignment and inaccuracy. Furthermore, a number of steps are needed to make each setup. Slats must be added, removed, or shifted for proper fence positioning. If the saw assembly has a one-piece top with permanently attached fence, the whole unit must be maneuvered to make fence adjustments. Thus, even more manipulations are required in making setups. The one-piece top cannot fit tightly within a workbench. Multiple grooving of the top is not avoided.

The rip guide fence in conventional radial saws becomes slotted in many places or if the fence is very long, it develops a few wide, mutilated slots. Thus the rip fence is soon weakened and rendered unsafe to use. To keep the fence from slotting it must be shifted from side to side. This prevents tight fitting of the saw assembly to or within a workbench and adds more motions required for each setup.

The saw assembly embodying the present inventioin avoids the above-mentioned and other difficulties and disadvantages, and at the same time it is less complicated in construction. It is easier and safer to use; has a longer useful life; it is less expensive to construct; replacement parts are less costly; and other benefits and advantages are derived as will become apparent.

According to the present invention, there is provided a radial saw assembly or machine, in which all axes of swivel and tilt and all turning radii are coordinated or in line with a point at the bottom edge of the saw blade. This construction makes it possible to use a steel table top with a rotatable circuit sub-unit or table plate set in flush with the top. The diameter of the table plate is somewhat larger than the horizontal track upon which the saw carriage is mounted. The rotatable table plate has a beveled groove, wide and deep enough for cut-off operations, running diametrically across the table plate. A beveled grooved grid insert is slidably insertable in a slightly widened beveled groove for rip cut-off operations. This insert is about one half the diametrical width of the rotatable table plate.

The present saw assembly employs a steel guide fences. The fence has two equal aligned, spaced parts separated slightly at the center of the circular table plate. This fence is made of slats so connected as to permit each one to slide lengthwise over the other laterally of the saw table, to facilitate making bevel cuts. These slats are fixed semi-permanently to the saw table and need to be removed only for wide rip cuts. The front edge of this slatted fence is parallel to the front edge of the rectangular saw table and extends along a diameter of the rotatable table plate. The end or edge of each fence section near the center of the table plate is tapered at the rear to allow for miter cuts. The fence can be moved back and clamped at the rear of the saw table and thereby is located in front of a fixed column base to serve as a guide in making wide rip cuts.

In order to keep the bottom edge of the saw blade in line with specific coordinates while making setups, the yoke employed in conventional radial saws is eliminated. Instead, a wedge-shaped sector assembly is hung with its curved side up carrying electric drive motor means. A transmission mechanism is inside the sector. A saw arbor is carried axially perpendicular to one vertical side of the sector at the bottom of the tapered or apical end thereof. The sector is arranged so that the bottom edge of the saw blade is brought into direct alignment with the pivot axis of a swivel assembly which is axially aligned with the center of a saw carriage and with the longitudinal central line of a track. The swivel assembly and carriage are held together by a clamp. The saw blade spins about a correlated point for rip cut operations.

Three circular curved arcuate guide rails are disposed perpendicular to both the swivel axis and the longitudinal central line of the track. They provide means for tilting the saw blade for bevel cuts. The curvature of the guide rails is circumscribed from the same point at or near the bottom edge of the saw blade as is used for rip cuts.

The horizontal track arm is centered directly above the center of the rotatable table plate. An axially vertical rotatable turret holds a track clamp, and the track is slidably held in the track clamp. Thus when the saw is used in mitering, the plane of the saw blade always passes through the axis of rotation of the table plate and the single opening of the two-part miter fence. Since the track is movable back and forth in the direction of its length in the track clamp, necessary clearances are provided when making mitering and double mitering cuts.

This shifting of the track when mitering eliminates the need of moving the fence at all by positioning the saw blade back far enough to clear the piece being worked. Mitering and track shifting operations are performed simultaneously since both are confined in the turret assembly.

It is therefore a principal object of the invention to provide an improved radial saw in which the saw blade is so supported that it is tilted and rotated around axes coordinated with a point at the bottom edge of the saw blade.

A further object is to provide a radial saw as described, with a saw table made of smooth, dimensionally stable material, which may be as hard as or harder than the teeth of the saw blade.

Another object is to provide a table for a radial saw with a rotatable table plate insert having a diametral groove to receive the bottom edge of the saw blade for cut-off operations and a grooved grid insert for the rip cut operations.

Other objects are to provide in a radial saw an elevating column structure of simplified construction, the column having a turning nut or ring secured to the base and an externally threaded column; to provide a two-part miter fence with overlapping longitudinally sliding slats or bars; to provide a rotatable circular dimensionally stable, metal tableplate insert with a diametral groove; to provide a novel rotatable turret; to provide a novel track structure; to provide a swivel and carriage structure; to provide a novel motor-driven curved rail assembly; to provide a novel sector support for a saw blade, drive motors and speed transmission mechanism. Further objects are to provide a radial saw which is easier to use; which provides continuous service without loss of accuracy of parts, or deterioration of parts; which produces work of greater accuracy; which is attractive in appearance and which remains so with continued use.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 2 is a front elevational view of the saw on a scale enlarged over that of FIG. 1.

FIG. 3 is a fragmentary further enlarged central sectional view of the radial saw, taken on line 3—3 of FIG. 2.

FIG. 3A is a fragmentary still further enlarged view of a part of FIG. 3.

FIG. 4 is an enlarged sectional view through a carriage and motor drive assembly of the saw.

FIG. 5 is a fragmentary sectional view taken on line 5—5 of FIG. 4.

FIG. 6 is a top plan view of a carriage assembly.

FIG. 6A is a transverse sectional view taken on line 6A—6A of FIG. 6.

FIG. 7 is an enlarged sectional view taken on line 7—7 of FIG. 1 showing a turret assembly.

FIG. 8 is an exploded perspective view of parts of the table, rotatable table plate and fences of the radial saw.

FIGS. 9, 9A and 9B are respectively exploded perspective views of various parts of the radial saw.

FIG. 10 is an enlarged sectional view taken on line 10—10 of FIG. 8.

Figure 1:
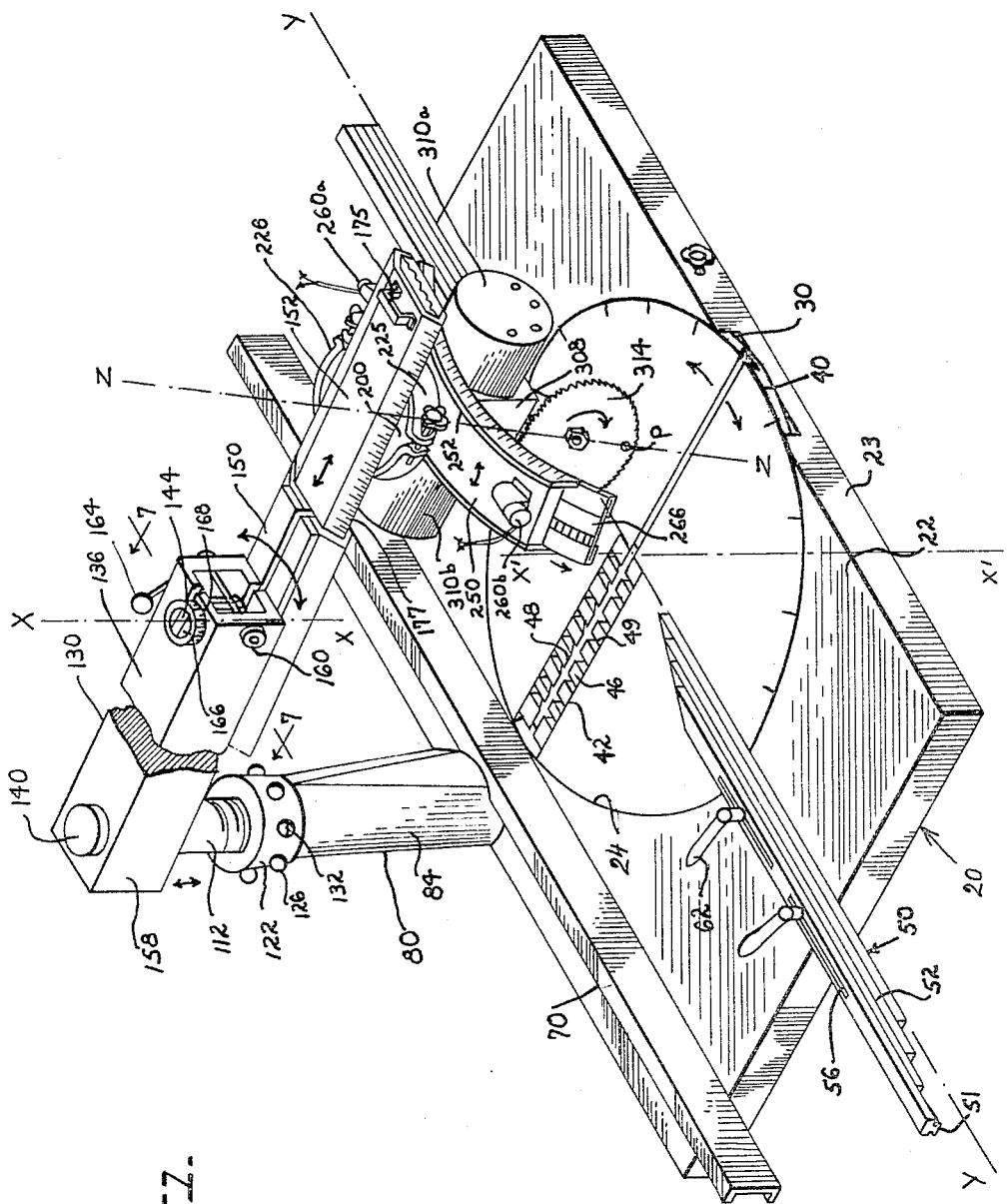
FIG. 1 is a perspective view of a radial saw embodying the invention.

Referring first to FIGS. 1–3 and 8, there is shown a flat rectangular saw table 20 having a steel top 22. In the table top, is a shallow circular recess 24 with flat central bottom 26 and cylindrical wall 28. A circular steel plate 30 is manually rotatable in recess 24 on bottom 26 thereof. The plate 30 projects outwardly slightly beyond the forward edge 32 of the table top where the plate can be manually grasped for turning. To facilitate turning there is provided a centrally located ball bearing ring 34 shown in FIG. 8. The plate 30 rotates on this ring. Ring 34 fits into a shallow recess 36 centrally located in the bottom 26 of recess 24. The top of table plate 30 is flush with the upper surface of the table top 22. A ring 38 may be provided around the bearing ring to serve as a dust shield. A scale for miter cuts is provided about the circumference of the steel plate 30.

Extending radially of the plate 30 at its upper edge is a dovetail groove 40 to facilitate bevel cuts. A wide groove 42 with undercut beveled edges 44 slidably receives a rectangular steel plate 46 having chamfered edges 47 which interfit tightly with the undercut edges 44. Plate 46 is slidable inwardly and outwardly of plate 30 in a radial direction aligned with the radial groove 40. Plate 46 can slide entirely out of the groove 42 if plate 30 is turned around to locate the outer end of the groove at the front edge 32 of the table top. Plate 46 has mutually perpendicular longitudinal and transverse grooves 48, 49 in its upper surface to define a rectangular grooved grid.

A miter guide fence assembly 50 is removably mounted on the table top. This fence includes two piles of bars 52. The bars in each pile are mutually engaged by ridges 51 at the undersides of the bars engaging in grooves 53 of the lower plates; see FIG. 10. The bars are aligned with each other diametrally of the table plate 30 with adjacent beveled or tapered ends 54 of the bars spaced slightly apart just enough for the blades to pass through near the center of the table plate. The bars are longitudinally adjustable. They have registering slots 56 which receive locking pins 57; see FIG. 8. The pins have cross pins 58 which engage in slots 60 formed in the top of plate 22. When the cross pins are aligned with the slots 60 the fence bars can be removed completely. Handles 62 on upper ends of the pins 57 serve to turn the pins. A rip guide fence 70 can be bolted by bolts 72 and washers 74 upon the table top and used for making small rip cuts instead of having to shift the guide fence 50 for this purpose.

The column base 84 has a tapered bottom end 98 which fits in a tapered hole 100 in the top 22 near its rear edge. A ring nut 102 and lockwasher 104 engage on the bottom threaded end of the column base underneath the table top to hold it securely and accurately in an axially vertical position with respect to the horizontal table top. The ring has recesses 105 for engagement by a spanner wrench. A split cylindrical guide member 106 made of spring steel is secured by screw 107 near the top of axial passage 108 in the column base. The guide member is axially vertical. This guide member extends through and being under pressure engages opposing edges of a slot 110 formed in hollow column 112. The guide member 106 also keeps column 112 from turning.

Column 112 is slidably mounted in passage 108 of the column base. Threaded pins 114 are screwed in holes 116 near the top of the column base. These pins carry rotatable wheels 118 rotating on ball bearings 120. The wheels are disposed circumferentially around the column base. Wheels 118 ride in an internal circumferential groove 121 formed in an adjustment nut or ring 122. The ring is mounted on top of the column base around the column. The ring has an internal thread 124 which engages with external thread 125 on column 112. Knobs 126 are secured on ring 122. They are spaced circumferentially around the ring and extend radially outward to facilitate manually turning the elevating ring so that the threaded column slides axially up and down for raising and lowering horizontal arm 130. A hole 132 is provided in the ring 122 through which pins 114 carrying wheels 118 can be inserted one at a time for mounting on the column base inside the ring.

Arm 130 is nonrotatably mounted at the upper end of column 112. The upper tapered end 112' of the column extends through aligned tapered holes 134 in top and bottom walls 136, 137 of the arm. The arm has a hollow box construction and is provided with a diagonally disposed stiffener or brace plate 138. A cap screw 140 engages with internal thread 142 at the top of the column so that the column and arm are secured together.

At the forward end of the arm is a turret assembly shown to best adavantage in FIGS. 1, 2, 7, 9, 9A and 9B. This assembly includes a rectangular box-shaped wedge locking plate 144 which fits between two cylindrical tapered post segment sections 146. Secured at the bottom of each segment section is a guide clamp 150 for a track 152. The two post segment sections are inserted axially through inwardly tapered aligned holes 153 at the front end of the arm. Plate 144 is inserted between the post segment sections so that they are snugly fitted in the aligned holes 153. Slots 155 are provided at the forward ends of walls 136 and 137, of the arm 130. These slots extend to holes 153. The holes can be slightly constricted by a clamping structure including a shaft 154 which passes through aligned holes 156 in side walls 158, 159 of the arm. The threaded end of the shaft engages in a nut 160 held nonrotatably on side wall 158 by projecting lugs 162 engaging in holes 163 of wall 158. A crank handle 164 attached to the shaft 154 facilitates the shaft so that the post sections of the turret can be locked in arm 130 and simultaneously guide clamp 150 tightens about track 152 when the ends of walls 136, 137 are constricted at holes 153 around the post segment sections. Heads 166 at upper ends of the post sections extend above the upper wall 136 of the arm and carry an arcuate graduated scale 168 about its circumference which indicates the angular position of rotation of the track 152 carried by the turret structure.

Guides 150 have channeled flanges 170 which engages correspondingly channeled flanges 172 at opposite edges of track 152. Thus the track 152 is longitudinally slidable in the guides 150, and is rotatable around the axis of the turret structure in holes 153 of the arm. A handle 175 at the forward end of the track facilities manually pulling the track forward and retracting the track in the track guides 150. Opposite ends of the track are silghtly compressed and closed by crossbar clamps 176 held in place by coil springs 178 anchored at opposite hooked ends in holes at the ends of the track flanges. Graduated scales 177 are provided on opposite sides of the track flanges to indicate the position of the track when extended from the guide 150.

A carriage assembly best shown in FIGS. 4, 6, 9, 9A and 9B is slidably supported in the track. The carriage assembly has a top disk 200 provided with a diametrally extending platform 202. Into this platform are screwed shanks of three bolts 204. Washers 206 are provided under the heads of the bolts. Under the washers are ball bearing races 208. Three rings 209, 210 and 211 rotate against each other on the respective bearing races in a horizontal plane. Under bolt holding ring 211 is a shim just thick enough to permit the ring and bearing to move laterally from the compression of the track flanges as it wears to insure constant contact between the rings. As endless belt 212 is entrained around wheel rings 209 and 210 and an inner side of wheel ring 211, yet permitting all the wheel rings to be in rolling contact with each other. The edge portions of the rings project laterally of the platform and engage under compression the inner sides of the track flanges 172. The platform is located between or below facing edges of the track flanges 172 so that the disk 200 is slidable underneath the track while being supported thereby. The function of the endless belt 212 is to keep the ball bearings 208 free of lateral forces tending to spread them due to inward movement of wheel ring 211. The belt advances and the rings turn to facilitate sliding movement of the disk along the track without lateral play or looseness. A vice type of clamp 214 fits in a groove 218 on top of the disk. It has a wedge-shaped anvil 220 to engage inside one track flange while a V-shaped clamp member 222 advanced by a knob 224 engages outside the track flange. Thus, the disk 200 can be locked in position along the track.

The clamp 214 fits between facing ends of two arcuate swivel clamps 225, 226. These clamps attach a lower disk 228 to disk 200 in axial alignment and circumferential registration but permit relative rotation when clamping bolts 230 are loosened. The clamping bolts have shanks passing through holes 232 across the split clamp 225 and engage in threaded holes 234 in ends of clamp 235. Two parallel circumferential ridges 238 are provided on the inner sides of clamps 225 and 226. These ridges engage in a circumferential groove 240 in disk 228, keeping both disks in true alignment and adjust for wear.

Attached to the underside of disk 228 is an arcuate outer rail 250. This rail is circularly curved and is approximately seventy-five degrees in angular extent. Arcuate flanges 252 are attached to opposite lateral edges of the rail 250. A pair of small motors 260a, 260b having operating switches 261 are mounted at openings 262 near opposite ends of the rail 250. These motors drive worm gears 264 which engage gear teeth 268 in an inner arcuate rail 266.

Rail 266 has opposite-sided rack gear teeth 268 provided along its center. The reversible motors 260a, 260b when energized can cause the inner rail 266 to move in the direction of its length underneath the outer rail 250. Rail 266 has inturned flanged edges 267 for slidably engaging inside of inturned edges 270 of the flanges 252. Graduated scales 272 are provided on the flanges 252. Grooves 273 are provided inside flange edges 270 and grooves 269 are provided in flange edges 267 to reduce friction of sliding parts to be fitted therewith.

An innermost arcuate rail 280 is slidably engaged in rail 266. The rail 280 has upwardly and inwardly turned flanged edges 281 engaged within flange edges 267. Screws 282 secure rail 280 to the top of sector structure 300. Through an opening 302 in the rail 280 projects a worm gear 304 driven by a motor 306 in the sector housing 308; see FIG. 5. Gear 304 is driven by the motor via a pair of bevel gears 307, 309. Gear 304 engages with the bottom side of gear teeth 268 for turning the sector structure 300 relatively to the rail 266. Thus motors 260a, 260b turn the rail 266 with respect to rail 250 and motor 306 turns the sector structure 300 with respect to rail 266. The use of these three rails is to make this unit compact and versatile with the saw blade tilting over forty-five degrees or more with the sector 308 clearing the top of the meter guide fence 50 and tilting all the way back over until the plane of the saw blade is parallel with the table top.

A pair of motor assemblies 310a, 310b are mounted on opposite sides of the sector housing 308 for driving the arbor 312 on which saw blade 314 is removably mounted by nut 316 and washers 318, 320. The arbor rotates in ball bearings 322 and is driven via a flexible cable 324 or other suitable means and bevel gear 325. This gear 325 engages a bevel gear sleeve 327 carried on a free bearing sleeve 329 surrounding the drive shaft 328 of motor assembly 310a. A variable speed split pulley 330 on which is entrained a belt 332 is fixed to bevel gear sleeve 327, see FIG. 4. This belt 332 is engaged on another variable speed double split pulley 334 carried by idler speed adjustment shaft 336. Another belt 340 engages the variable speed pulley 334 on shaft 336 and a variable speed pulley 342 on the shaft 344. A speed guard 350 may be provided for the saw blade. The guard can be adjusted in position on flange 352 by means of handle 352a on clamp 353. A speed control knob 354 for the double split speed pulley 334 is mounted just outside of a motor electric control box 356 in housing 308 to vary the speed of the pulleys.

Cross cutting

For operation of the saw assembly in making cross cuts, the setup will be as follows: Rail 266 is disposed in rail 250 by operating either reversible motor 260a or 260b to move the rail 266 in one direction or the other. Motor 306 in housing 308 will be operated to dispose rail 280 to one side in rail 266. These adjustments will place the saw blade in a vertical plane. There is no need to operate both rails at all times. During these adjustments, the saw blade will be rotated around a horizontal axis passing through point P at its bottom edge. The point P will be located in vertical axis Z—Z which passes through the center of the carriage disks 200, 228, and through the longitudinal center of track 152. The carriage 200 will be moved inwardly to its most retracted position in track 152. This track 152 can be adjusted in track guides 150 so as to place the saw blade at a safe position behind guide fence 50. The track and carriage will be rotated with the turret assembly so that the plane of the blade is perpendicular to the axis Y—Y, the front edge 32 of the table panel 22 and the fence 50. Table plate 30, if the saw blade is not within groove 40, will be rotated to dispose groove 40 perpendicular to axis Y—Y. This will place the axis Z—Z and point P behind the axis X—X of the turret assembly 144, 146 at the forward end of arm 130, and with the vertical axis X'—X' passing through the center of table plate 30. The central vertical plane of the saw blade will be aligned with the vertical axis of the column 112, and this plane will be bisected by a vertical plane including the horizontal transverse axis Y—Y extending diametrically of the table plate 30. The motor assemblies 310a or 310b will be turned on, speed control dial 354 turned for the desired speed of operation of the saw. The carriage will now be drawn out for cutting a work piece placed on the table with its rear edge abutting the fence 50. For cutoff work the bottom edge of the saw blade will enter and pass along the groove 40 but will not touch the bottom of the groove since this is the lowermost position it can assume. Column 112 is then at its lowest position in the column base 84. In a single pass of the saw blade forwardly along groove 40 as the carriage 200 moves in the track 152, the cross cut is made accurately. The scale on plate 30 greatly helps the operator to make faster set ups.

If the work is not to be cut off entirely, then the adjustment nut or ring 122 can be turned to elevate the column, arm, track, and the remainder of the carriage structure. The blade 314 will rise vertically while retaining its position perpendicular to axis Y—Y. In a single pass of the blade through the work as the carriage is moved horizontally, a groove transverse to axis Y—Y will be made.

Miter cutting

For miter cutting the setup will be the same as for cross cutting with the following adjustments. The turret assembly will be turned in the stationary horizontal arm 130, the track adjusted simultaneously, and then both locked by operating clamp handle 164. The angular position of blade 314 which is in a vertical plane will be indicated by the arcuate scale 168. The work can now be placed against fence 50 and the miter cut made. The miter cut can be cut-off operation with the saw blade fully lowered or can be a groove cut with the blade elevated above the table plate. The table plate 30 will be turned so that groove 40 aligns with the plane of the saw blade, for cut off.

Bevel cutting

For simple bevels taken in the cross cut direction perpendicular to axis Y—Y, the setup will be the same as for cross cutting with the following adjustments. Either motor 260a or 260b will be operated to rotate the rail 266 inside rail 250, and or motor 306 can be operated to rotate the rail 280 inside rail 266. The bevel scale 272 on flange 252 will indicate the angular position of the plane of the saw blade with respect to the central, vertical plane X'—X' of the table perpendicular to axis Y—Y and including axes X—X and Z—Z. The sector 300 will, of course, turn with the rail 266 or rail 280. An adjustment of over forty-five degrees is provided at one side of axis Z—Z and over ninety degrees to the other side. The work will be set against fence 50 and the carriage 200 moved in track 152 to effect the bevel cut. The table plate 30 will be turned so that groove 40 aligns with the saw blade if it is a cut off operation.

*Compound bevel cutting*

The setup for compound bevels will be the combined operation for miter and bevel cutting. It will be noted that the saw blade passes between the spaced tapered ends of the two fence parts or sections at the center of the table plate.

*Rip cutting*

For rip cuts with narrow stock or work pieces, the fence 50 may be used without the need of shifting it rearwardly. The setup will be the same as for cross cutting with the further adjustment of turning the rails and sector assembly ninety degrees with the swivel clamp 225 released until the ninety degree turn stop is reached in the top of the disk 228 and bottom of disk 200. This will align the plane of the saw blade parallel to axis Y—Y. The table plate 30 will be turned to bring groove grid 46 to the front perpendicular to axis Y—Y, if not already brought around by the saw blade. The carriage assembly will be locked in place by means of clamp 214. The work can now be pushed along fence 50 into the rotating blade to effect the rip cut. If a beveled rip cut is required, the further adjustment for simple bevel cutting described above will be made.

For wide stock or wide pieces of work, the fence 50 may be removed and fence 70 may be used. The rear edge of the work will be guided along this fence. The central groove 48 will be continuous with groove 40 and the center of the table plate and the bottom edge of the blade will pass through both grooves during the rip cutting. The grid plate 46 is used for cut off operations and is aligned perpendicularly to the fence either at the rear or the front according to the size of work piece. The bottom of the blade edge will pass through the nearest one of the short grooves 49 as the carriage assembly is moved in the track for making the successive rip cuts. The grid plate 46 is movable radially in the table plate for precisely aligning any one of the grooves 49 with the plane of the blade.

It will be noted that for each particular type operation, very few adjustments need be made, considerably less than are required in conventional radial saws. The many possible operations of which the saw assembly is capable are performed easily, accurately, repeatedly and continuously. The panel 22 and the table plate cannot injure the saw blade so that these parts can be made of steel or other material at least as hard as the teeth of the saw blade. This makes it unnecessary to replace a table due to wear. If a table is accidentally damaged, it can be replaced at far less expense than is incurred with replacement of entire tables in conventional radial saws.

It should be noted that in all operations, the point P at the bottom edge of the saw blade is a point of reference lying in planes including the principal supporting points or axes of the column assembly, turret assembly, carriage, track, saw blade and saw table assembly. There is no tendency of the carriage and track to turn around the axis of the column assembly during cross cutting operations, and no tendency of the sector and arbor to turn around the axis of the carriage during ripping operations. This greatly lengthens the useful life of the saw assembly as compared with conventional radial saws where the saw blade is offset from the axes of yoke, carriage, track and column.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. In a radial saw in combination: a horizontal flat rectangular table structure; a column assembly at a rear edge of said table, said column assembly including a fixed axially vertical hollow cylindrical base, a column axially movable in said base, said column having an external thread, an internally threaded nut rotatably engaged with the external thread of said column, means holding said nut rotatably on the upper end of said column base so that rotation of said nut advances and retracts said column axially in said column base; an arm secured at one end to said column and extending forwardly horizontally over the center of said table, a turret assemby supported at the forward other end of said arm and rotatable on a vertical axis passing through the center of the table, a track clamp secured to said turret and rotatable therewith, a track horizontally slidable in said clamp, and a saw blade carriage supported by said track so that the carriage is movable horizontally on a line in a vertical plane including the vertical axis of said column, the axis of rotation of said turret assembly and the center of said table, a first arcuate rail supported by said carriage, a second arcuate rail supported within said first rail and movable circumferentially with respect to the first rail, a third rail supported within said second rail and movable along the second rail, and motor means carried by the third rail for rotatably supporting a saw blade with a bottom edge adjacent the table; said first, second and third rails each having a center of curvature at a common point at the bottom edge of the saw blade, said motor means supporting the saw blade so that said point lies in said vertical plane including the axis of rotation of said turret assembly, the vertical axis of said column and the center of said table.

2. In a radial saw in combination: a horizontal flat rectangular table structure; a column assembly at a rear edge of said table, said column assembly including a fixed axially vertical hollow cylindrical base, a column axially movable in said base, said column having an external thread, an internally threaded nut rotatably engaged with the external thread of said column, means holding said nut rotatably on the upper end of said column base so that rotation of said nut advances and retracts said column axially in said column base; an arm secured at one end to said column and extending forwardly horizontally over the center of said table; a turret assembly supported at the forward other end of said arm and rotatable on a vertical axis passing through the center of the table, a track clamp secured to said turret and rotatable therewith, a track horizontally slidable in said clamp, and a saw blade carriage supported by said track so that the carriage is movable horizontally on a line in a vertical plane including the vertical axis of said column, the axis of rotation of said turret assembly and the center of said table, a first arcuate rail supported by said carriage, a second arcuate rail supported within said first rail and movable circumferentially with respect to the first rail, a third rail supported within said second rail and movable along the second rail, first motor means carried by the first rail for moving the second rail along the first rail, a housing carried by the third rail, second motor means in said housing for moving the third rail along the second rail, arbor means carried by said housing for rotatably supporting a circular saw blade with a bottom edge adjacent the table, and third motor means carried by said housing and operatively connected to said arbor for rotating the saw blade.

3. In a radial saw in combination: a horizontal flat rectangular table structure; a column assembly at a rear edge of said table, said column assembly including a fixed axially vertical hollow cylindrical base, a column axially movable in said base, said column having an external thread, an internally threaded nut rotatably engaged with the external thread of said column, means holding said nut rotatably on the upper end of sail column base so that rotation of said nut advances and retracts said column axially in said column base; an arm secured at one end to said column and extending forwardly horizontally over the center of said table; a turret assembly supported at the forward other end of said arm and rotatable on a vertical axis passing through the center of the table, a track clamp secured to said turret and rotatable therewith, a track horizontally slidable in said clamp, and a saw blade carriage supported by said track so that the carriage is movable horizontally on a line in a vertical plane including the vertical axis of said column, the axis of rotation of said turret assembly and the center of said table, a first arcuate rail supported by said carriage, a second arcuate rail supported within said first rail and movable circumferentially with respect to the first rail, a third rail supported within said second rail and movable along the second rail, first motor means carried by the first rail for moving the second rail along the first rail, a housing carried by the third rail, second motor means in said housing for moving the third rail along the second rail, arbor means carried by said housing for rotatably supporting a circular saw blade with a bottom edge adjacent the table, and third motor means carried by said housing and operatively connected to said arbor for rotating the saw blade, said first, second and third rails each having a center of curvature at a common point at the bottom edge of the saw blade said arbor means supporting the saw blade so that said point lies in said vertical plane including the axis of rotation of said turret assembly, the vertical axis of said column and the center of said table, whereby said point lies on a common horizontal axis of rotation of the second and third rails and whereby the saw blade turns on said horizontal axis when the rails are rotated around said horizontal axis.

4. In a radial saw in combination: a horizontal flat rectangular table structure; a column assembly at a rear edge of said table, said column assembly including a fixed axially vertical hollow cylindrical base, a column axially movable in said base, said column having an external thread, an internally threaded nut rotatably engaged with the external thread of said column, means holding said nut rotatably on the upper end of said column base so that rotation of said nut advances and retracts said column axially in said column base; an arm secured at one end to said column and extending forwardly horizontally over the center of said table; a turret assembly supported at the forward other end of said arm and rotatable on a vertical axis passing through the center of the table, a track clamp secured to said turret and rotatable therewith, a track horizontally slidable in said clamp, and a saw blade carriage supported by said track so that the carriage is movable horizontally on a line in a vertical plane including the vertical axis of said column, the axis of rotation of said turret assembly and the center of said table, a first arcuate rail supported by said carriage, a second arcuate rail supported within said first rail and movable circumferentially with respect to the first rail, a third rail supported within said second rail and movable along the second rail, first motor means carried by the first rail for moving the second rail along the first rail, a sector-shaped housing carried by the third rail, second motor means in said housing for moving the third rail along the second rail, arbor means carried by said housing for rotatably supporting a circular saw blade with a bottom edge adjacent the table, variable speed transmission means in said housing connected to said arbor means for driving the same, and third motor means carried by said housing and connected to said variable speed transmission means for rotating the saw blade on its central axis via said arbor means and said transmission means.

5. In a radial saw in combination: a horizontal flat rectangular table structure; a column assembly at a rear edge of said table, said column assembly including a fixed axially vertical hollow cylindrical base, a column axially movable in said base, said column having an external thread, an internally threaded nut rotatably engaged with the external thread of said column, means holding said nut rotatably on the upper end of said column base so that rotation of said nut advances and retracts said column axially in said column base; an arm secured at one end to said column and extending forwardly horizontally over the center of said table; a turret assembly supported at the forward other end of said arm and rotatable on a vertical axis passing through the center of the table, a track clamp secured to said turret and rotatable therewith, a track horizontally slidable in said clamp, and a saw blade carriage supported by said track so that the carriage is movable horizontally on a line in a vertical plane including the vertical axis of said column, the axis of rotation of said turret assembly and the center of said table, a first arcuate rail supported by said carriage, a second arcuate rail supported within said first rail and movable circumferentially with respect to the first rail, a third rail supported within said second rail and movable along the second rail, first motor means carried by the first rail for moving the second rail along the first rail, a sector-shaped housing carried by the third rail, second motor means in said housing for moving the third rail along the second rail, arbor means carried by said housing for rotatably supporting a circular saw blade with a bottom edge adjacent the table, variable speed transmission means in said housing connected to said arbor means for driving the same, and third motor means carried by said housing and connected to said variable speed transmission means for rotating the saw blade on its central axis via said arbor means and said transmission means, said first, second and third rails each having a center of curvature at a common point at the bottom edge of the saw blade, said arbor means supporting the saw blade so that said point lies in said vertical plane including the axis of rotation of said turrent assembly, the vertical axis of said column and the center of said table, whereby said point lies on a common horizontal axis of rotation of the second and third rails and whereby the saw blade turns on said horizontal axis when the rails are rotated around said horizontal axis.

6. In a radial saw in combination: a horizontal flat rectangular table structure; a column assembly at a rear edge of said table, said column assembly including a fixed axially vertical hollow cylindrical base, a column axially movable in said base, said column having an external thread, an internally threaded nut rotatably engaged with the external thread of said column, means holding said nut rotatably on the upper end of said column base so that rotation of said nut advances and retracts said column axially in said column base; an arm secured at one end to said column and extending forwardly horizontally over the center of said table; a turret assembly supported at the forward other end of said arm and rotatable on a vertical axis passing through the center of the table, a track clamp secured to said turret and rotatable therewith, a track horizontally slidable in said clamp, and a saw blade carriage supported by said track so that the carriage is movable horizontally on a line in a vertical plane including the vertical axis of said column, the axis of rotation of said turret assembly and the center of said table, said table structure including a horizontal flat rectangular panel, made of dimensionally stable material, said panel having a circular recess in its top surface, and a circular table plate rotatably disposed in said recess, said table plate having a diametral groove for receiving a bottom edge of the saw blade during cut-off operations on a piece of work, said table plate being made of a material at least as hard as teeth of the saw blade.

7. In a radial saw in combination: a horizontal flat rectangular table structure; a column assembly at a rear edge of said table, said column assembly including a fixed axially vertical hollow cylindrical base, a column axially movable in said base, said column having an external thread, an internally threaded nut rotatably engaged with the external thread of said column, means holding said nut rotatably on the upper end of said column base so that rotation of said nut advances and retracts said column axially in said column base; an arm secured at one end to said column and extending forwardly horizontally over the center of said table, a turret assembly supported at the forward other end of said arm and rotatable on a vertical axis passing through the center of the table, a track clamp secured to said turret and rotatable therewith, a track horizontally slidable in said clamp, and a saw blade carriage supported by said track so that the carriage is movable horizontally on a line in a vertical plane including the vertical axis of said column, the axis of rotation of said turret assembly and the center of said table, a first arcuate rail supported by said carriage, a second arcuate rail supported within said first rail and movable circumferentially with respect to the first rail, a third rail supported within said second rail and movable along the second rail, and motor means carried by the third rail for rotatably supporting a saw blade with a bottom edge adjacent the table; said first, second and third rails each having a center of curvature at a common point at the bottom edge of the saw blade, said motor means supporting the saw blade so that said point lies in said vertical plane including the axis of rotation of said turret assembly, the vertical axis of said column and the center of said table, said table structure including a horizontal flat rectangular panel made of dimensionally stable, rigid material, said panel having a circular recess in its top surface, a circular table plate rotatably disposed in said recess, said table plate having a diametral groove for receiving a bottom edge of the saw blade during cut-off operations of a piece of work, said column operatively supporting said saw blade so that its bottom edge is spaced from the bottom of said diametral groove, and means for clamping said table plate in said recess with said groove extending in a selected position for cutting said piece of work, the material of said table plate being at least as hard as teeth of said saw blade.

8. In a radial saw in combination: a horizontal flat rectangular table structure; a column assembly at a rear edge of said table, said column assembly including a fixed axially vertical hollow cylindrical base, a column axially movable in said base, said column having an external thread, an internally threaded nut rotatably engaged with the external thread of said column, means holding said nut rotatably on the upper end of said column base so that rotation of said nut advances and retracts said column axially in said column base; an arm secured at one end to said column and extending forwardly horizontally over the center of said table; a turret assembly supported at the forward other end of said arm and rotatable on a vertical axis passing through the center of the table, a track clamp secured to said turret and rotatable therewith, a track horizontally slidable in said clamp, and a saw blade carriage supported by said track so that the carriage is movable horizontally on a line in a vertical plane including the vertical axis of said column, the axis of rotation of said turret assembly and the center of said table, a first arcuate rail supported by said carriage, a second arcuate rail supported within said first rail and movable circumferentially with respect to the first rail, a third rail supported within said second rail and movable along the second rail, first motor means carried by the first rail for moving the second rail along the first rail, a housing carried by the third rail, second motor means in said housing for moving the third rail along the second rail, arbor means carried by said housing for rotatably supporting a circular saw blade with a bottom edge adjacent the table, and third motor means carried by said housing and operatively connected to said arbor for rotating the saw blade, said table structure including a horizontal flat rectangular panel made of dimensionally stable, rigid material, said panel having a circular recess in its top surface, a circular table plate rotatably disposed in said recess, said table plate having a diametral groove for receiving a bottom edge of the saw blade during cut-off operations of a piece of work, said column operatively supporting said saw blade so that its bottom edge is spaced from the bottom of said diametral groove, the material of said table plate being at least as hard as teeth of said saw blade, said recess opening at a front edge of said panel, said table plate having a front edge portion extending beyond the front edge of the panel through said recess, a fence extending across opposite side edges of said panel, and clamping means cooperating with said fence and engaging a rear edge portion of said table plate therebetween for holding said table plate fixed in said recess so that said groove extends in a direction parallel to the plane of said saw blade.

9. In a radial saw in combination: a horizontal flat rectangular table structure; a column assembly at a rear edge of said table, said column assembly including a fixed axially vertical hollow cylindrical base, a column axially movable in said base, said column having an external thread, an internally threaded nut rotatably engaged with the external thread of said column, means holding said nut rotatably on the upper end of said column base so that rotation of said nut advances and retracts said column axially in said column base; an arm secured at one end to said column and extending forwardly horizontally over the center of said table; a turret assembly supported at the forward other end of said arm and rotatable on a vertical axis passing through the center of the table, a track clamp secured to said turret and rotatable therewith, a track horizontally slidable in said clamp, and a saw blade carriage supported by said track so that the carriage is movable horizontally on a line in a vertical plane including the vertical axis of said column, the axis of rotation of said turret assembly and the center of said table, a first arcuate rail supported by said carriage, a second arcuate rail supported within said first rail and movable circumferentially with respect to the first rail, a third rail supported within said second rail and movable along the second rail, first motor means carried by the first rail for moving the second rail along the first rail, a housing carried by the third rail, second motor means in said housing for moving the third rail along the second rail, arbor means carried by said housing for rotatably supporting a circular saw blade with a bottom edge adjacent the table, and third motor means carried by said housing and operatively connected to said arbor for rotating the saw blade, said table structure including a horizontal flat rectangular panel made of dimensionally stable, rigid material, said panel having a circular recess in its top surface, a circular table plate rotatably disposed in said recess, said table plate having a diametral groove for receiving a bottom edge of the saw blade during cut-off operations of a piece of work, said column operatively supporting said saw blade so that its bottom edge is spaced from the bottom of said diametral groove, the material of said table plate being at least as hard as teeth of said saw blade, said recess opening at a front edge of said panel, said table plate having a front edge portion extending beyond the front edge of the panel through said recess, a fence extending across opposite side edges of said panel, and clamping means cooperating with said fence and engaging a rear edge portion of said table plate therebetween for holding said table plate fixed in said recess so that said groove extends in a direction parallel to the plane of said saw blade, and another fence detachably secured to said panel, said other fence including two piles of elongated bars longitudinally slidable with respect to and engaged with each other, said two piles of bars being disposed in alignment with each other and extending diametrally across said table plate, adjacent ends of said piles of bars being spaced apart at the center of the table plate so that said saw blade moves therebetween, said adjacent ends of the bars being tapered to support said piece of work when the saw blade is making miter cuts.

References Cited by the Examiner

UNITED STATES PATENTS

| | | | |
|---|---|---|---|
| 260,783 | 7/1882 | Proctor | 30—310 X |
| 1,697,873 | 1/1929 | Lambert | 143—6 |
| 2,696,851 | 12/1954 | Davis | 143—6 |

FOREIGN PATENTS 591,212    8/1947    Great Britain.

DONALD R. SCHRAN, *Primary Examiner.*